United States Patent [19]

Lay

[11] 4,265,078
[45] May 5, 1981

[54] COTTON GLEANER

[76] Inventor: William D. Lay, P.O. Box 285, Idalou, Tex. 79329

[21] Appl. No.: 77,327

[22] Filed: Sep. 20, 1979

[51] Int. Cl.³ .............................................. A01D 45/18
[52] U.S. Cl. ........................................................ 56/28
[58] Field of Search .................. 56/28, 33, 34, 35, 36, 56/37, 38, 39, 49, 50

[56] References Cited

U.S. PATENT DOCUMENTS

| 3,117,405 | 1/1964 | Clare | 56/28 |
| 3,200,572 | 8/1965 | Sweet | 56/28 |
| 3,399,518 | 9/1968 | Gray | 56/28 |
| 3,408,799 | 11/1968 | Jennings | 56/28 |
| 3,651,624 | 3/1972 | Bandemer | 56/28 |
| 3,757,502 | 9/1973 | Hubbard | 56/28 |

Primary Examiner—Robert A. Hafer
Attorney, Agent, or Firm—Wendell Coffee

[57] ABSTRACT

A plurality of gleaner units are attached to the header of a self propelled cotton stripping unit, the cotton strippers having been removed. The gleaner units have an improved arm having a bifurcation at the end which permits easier adjustment of the length of the arm to maintain the belts tight. The bifurcated distal end also resulting in a longer life and more maintenance free ground pulley attachment.

8 Claims, 5 Drawing Figures

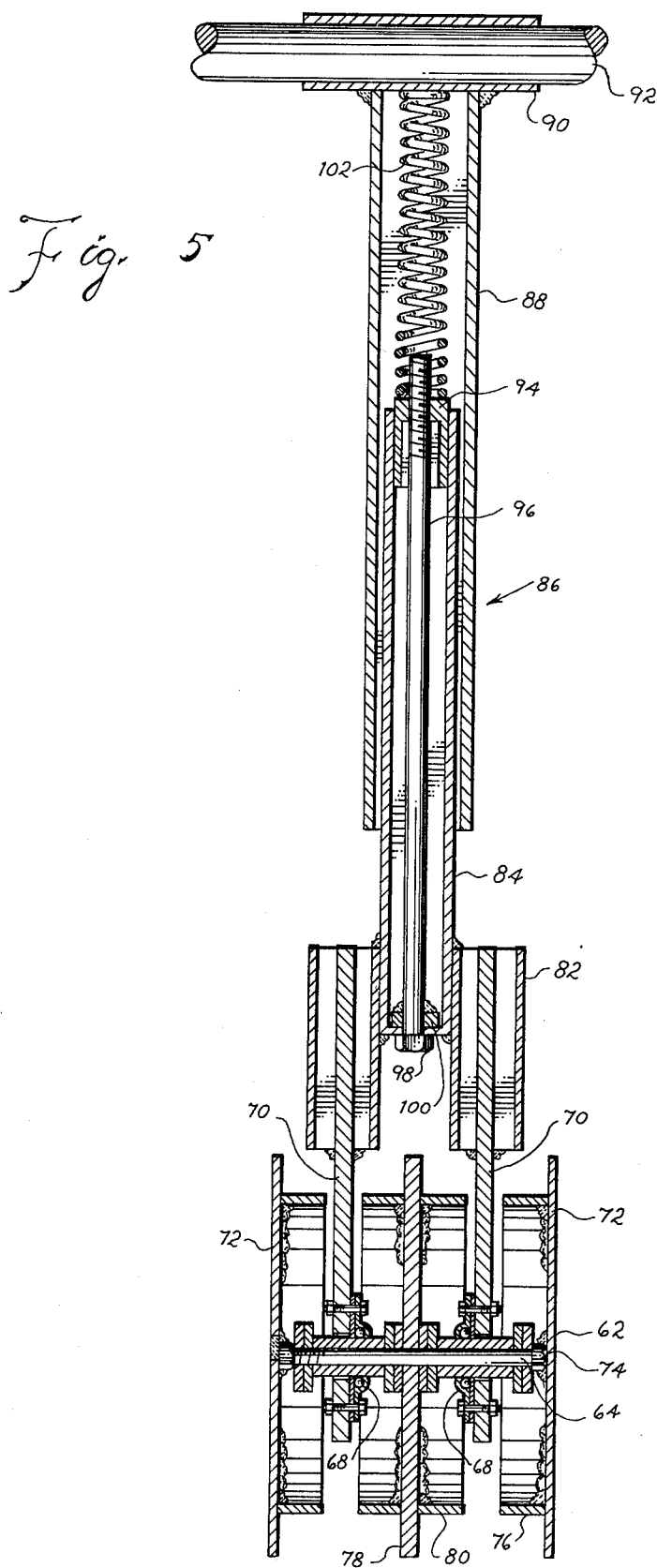

COTTON GLEANER

CROSS REFERENCE TO RELATED APPLICATIONS

None, however, applicant filed Disclosure Document No. 082,403, on or about the 9th day of July, 1979 which document concerns this application; therefore, by separate paper it is respectfully requested that the document be retained and acknowledgement thereof made by the Examiner. (MoPEP 1706)

BACKGROUND OF THE INVENTION

1. Field of the Invention

The invention relates to cotton gleaning and more particularly to picking up locks of cotton from the ground by a slotted gleaner belt trained around a drive pulley and ground pulley.

2. Description of the Prior Art

Since ROOD, JR., ET AL., U.S. Pat. No. 2,670,584 issued on Mar. 2, 1954, numerous cotton gleaners have been used to pick up locks of cotton from the ground.

GRAY, U.S. Pat. No. 3,399,518, discloses ROOD type gleaner with an arm extending to the ground pulley which is pivoted about a pivot shaft located between the drive pulley and ground pulley. The arm is shown to have one element telescoped within another.

WARMERDAM, U.S. Pat. No. Re. 26,311, also shows a ROOD type gleaner with the arm telescoped and shows the limit of the downward travel of the arm limited by bars or supports beneath the arm.

In commercial practice today the tubular portion of the arm has a helical compression spring telescoped therein which pushes against the inner member which is telescoped in the outer tubular member. Length adjustment or tension on the belts is adjusted by removing the inner member and placing one or more shims between the inner member and the helical compression spring. Commercially on the market and as far as ascertained from the ROOD, GRAY and WARMERDAM Patents, each of the arms have one ground pulley attached to it.

BUELL, U.S. Pat. No. 2,715,809, discloses a cotton gleaner which is mounted on the front of a self propelled vehicle having a header with a cross auger therein.

Before this patent application was filed, applicant caused a search to be made in the U.S. Patent and Trademark Office which revealed a patent to HUBBARD, U.S. Pat. No. 3,757,502, and BANDEMER, U.S. Pat. No. 3,651,624, however, applicant does not consider these patents as pertinent to his invention as those specifically discussed above.

SUMMARY OF THE INVENTION

1. New and Different Function

I have invented a cotton gleaner mounted upon the frame or chassis of a standard cotton stripper, i.e., I have found a standard cotton stripper ideally suited for this with its overhead basket to receive the gleaned cotton together with its header and cross auger therein feeding to an elevator which conveys cotton to the overhead basket.

I have found it desirable to mount the gleaners in units to the header. Each gleaner unit has two side plates which readily attach to the header. Then, the drive shaft extends through bearings in the side plates. The drive for the unit is provided by a hydraulic motor which is connected to drive tubes between the drive shafts. Thereby, if a row width spacing adjustment is desired, the length of the drive tubes can be changed and the gleaner units adjusted along the header.

Also, I have found on the the arm which supports the belt itself that a much more satisfactory unit is obtained if the two ground pulleys are mounted on a single arm. This results in a more sturdy connection of the ground pulleys to the end of the arm which results in less wear upon the pulley bearings and upon the belts themselves.

Furthermore, I have found that with the bifurcation there is a more convenient way to adjust the length of the arm, i.e., the tension on the belt. I have found that the inner member can be made expandable by an adjustment bolt which is coaxial with the arm. This adjustment is easily and quickly made in the field.

Thus it may be seen, that the total function of my combination far exceeds the sum of the functions of the individual parts, such as bolts, arms, side plates, etc.

2. Objects of This Invention

An object of this invention is to glean cotton.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scape drawings.

BRIEF DESCRIPTION OF THE DRAWINGS

FIG. 5 is a sectional view of one arm taken substantially on line 5—5 of FIG. 3.

DESCRIPTION OF THE PREFERRED EMBODIMENT

Figure 1:
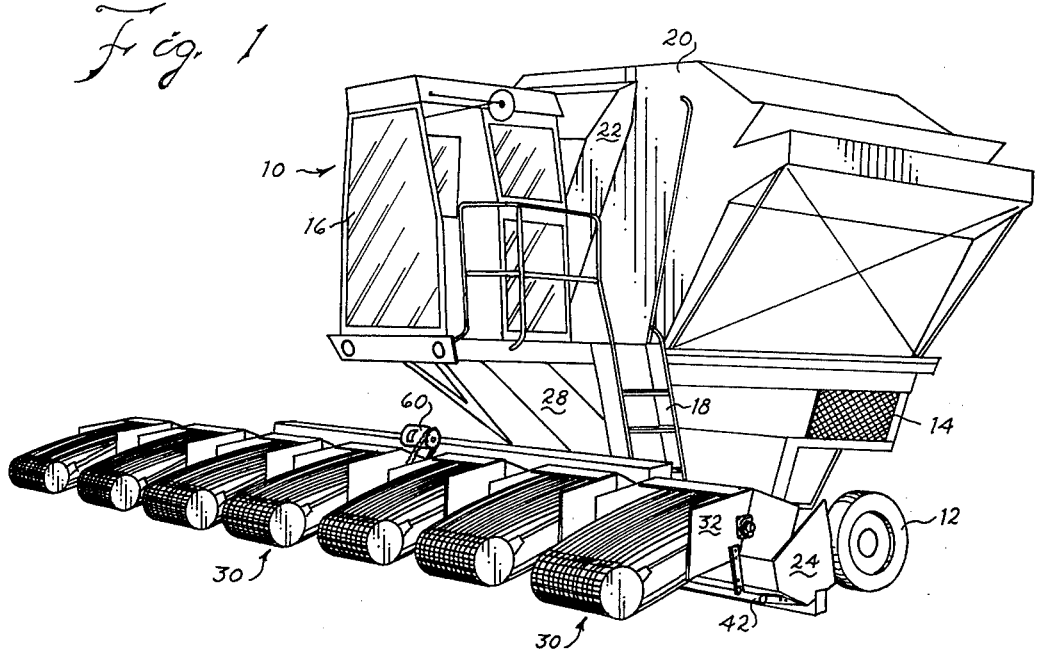
FIG. 1 is a perspective view of a gleaning machine embodying my invention.

Referring to the drawings, and more particularly to FIG. 1, there may be seen illustrated a gleaner. It may be seen that the gleaner includes wheeled vehicle 10. The vehicle will have the wheels 12 which will include both drive wheels and turning wheels as well as an engine as evidenced by cooling system 14. The vehicle 10 also includes cab 16 which the operator can reach by ladder 18.

Figure 2:
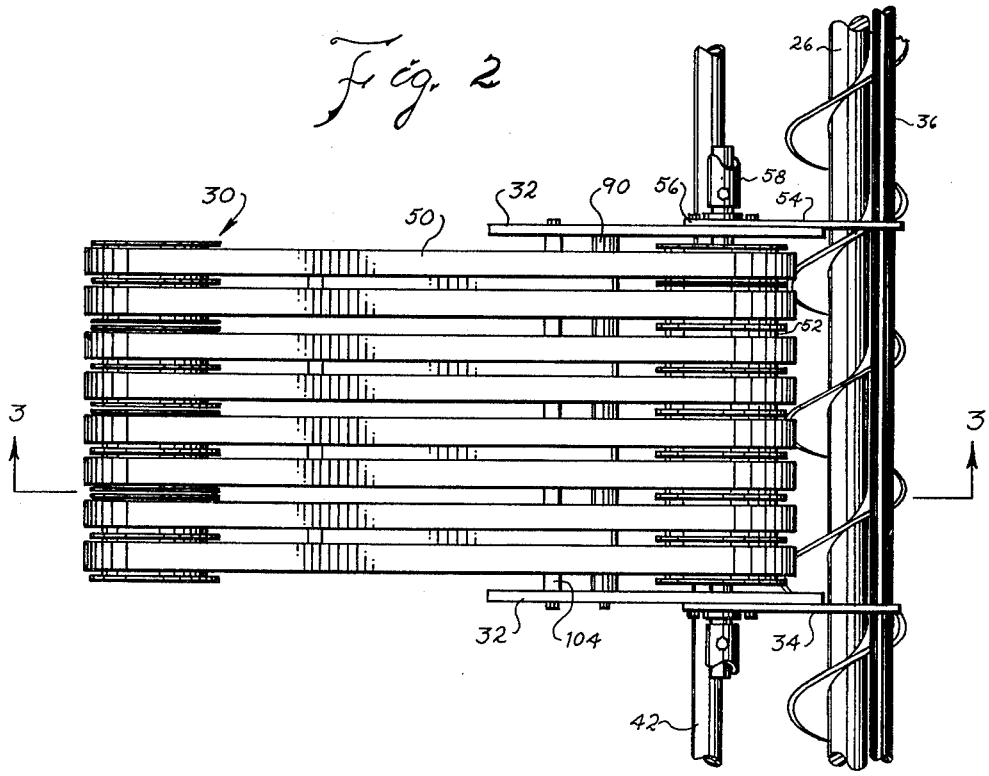
FIG. 2 is a top elevational view of one gleaning unit.
Figure 3:
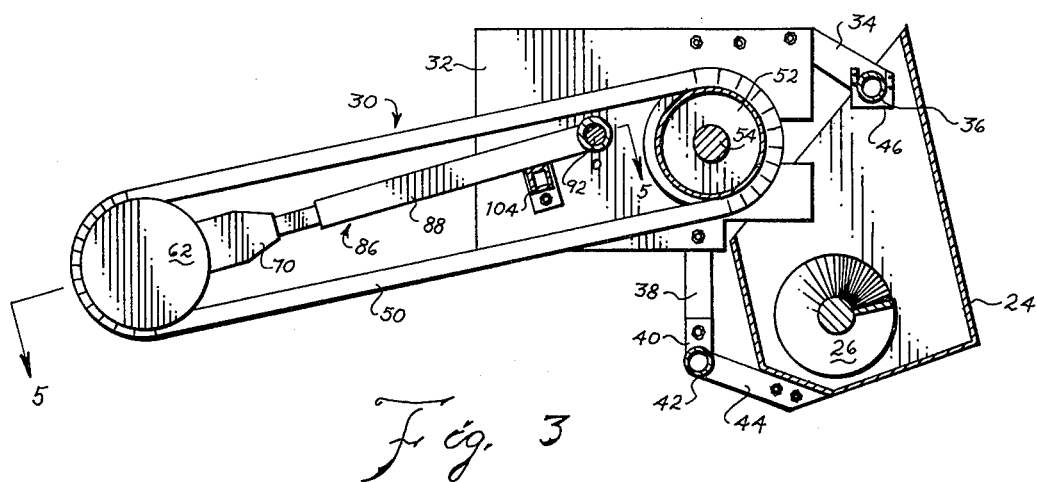
FIG. 3 is a side sectional view of a gleaning unit taken substantially on line 3—3 of FIG. 2.

Basket 20 upon the unit will collect gleaned cotton which is received through elevator 22. The gleaned cotton is collected within header 24 and conveyed by cross conveyor in the form of auger 26 (FIG. 2) to the point where it is first picked up by lower section 28 of the elevator 22.

Those having ordinary skill in the cotton harvesting arts will recognize the vehicle 10 as described to this point as a self propelled cotton stripper, without the stripping units themselves. According to my invention, the stripper units are absent from the header 24 and a plurality of gleaner units 30 attached thereto.

The gleaner units are illustrated without the covers, which would normally be attached thereto for safety and also to prevent any of the light fluffy locks of cotton from being lost once they had been gleaned. Thos having ordinary skill in the art will understand how covers are fitted over pieces of machinery.

Each of the gleaner units 30 include two side plates 32. The side plates are attached to the header by support arm 34 which extends back to top support 36. The arms 34 are bolted to the top rear of the side plates 32 as shown. The side plates 32 are also attached by feet 38 which are bolted to the lower rear of the side plates 32 and which extend to ears 40 upon lower tube 42 of the header. The lower tube is attached by an extension member 44 which itself is bolted to the header 24. As may be seen, each of the top arms 34 is attached by simple clamp 46 to the top tube 36.

Each gleaner unit 30 is illustrated as having eight slotted gleaner belts 50 thereon. These gleaner belts are standard gleaner belts as taught by the ROOD Patent cited above and also shown as used in GRAY and WARMERDAM. The gleaner belts are commercially on the market.

Each gleaner belt 50 is trained around drive pulley 52 mounted upon drive shaft 54 which is journalled within bearing 56 mounted upon the side plates 32. The drive shaft 54 is driven by drive tube 58 which telescopes over the ends of the drive shaft 54. At about the center of the units 30, hydraulic motor 60 is drivingly connected to the drive shafts 54 by a chain drive. The hydraulic motor 60 does not produce sufficient torque to spin the belts on the ground. Expressed otherwise, the motor 60 urges the belts to rotate so that the belts maintain synchronized travel on the ground. The motor 60 functions in a manner analogous to a clutch so that at the point of contact of the belts to the ground there is no relative movement. Those having ordinary skill in the art will understand how to connect the hydraulic motor to suitable control valves located within the cab 16 and also how to structurally mount the motor 60 on the header 24 and connect the chain drive to the suitable drive tube 58.

If the spacing between the units is to be adjusted so that it will accommodate different width rows, e.g., a 38" row as opposed to a 48" row, all that is necessary is to change the lengths of the various drive tubes 58 and also change the lower support tube 42 so that the ears 40 thereon are attached at the desired spacing. The top support arms 34 will slide along the top support tube 36 or if they will not readily slide along top support tube 36, the clamp 46 may quickly be loosened so that the units can be moved to the desired position. The drive tubes 58 also will accomodate any slight misalignment between the various drive shafts 54 of the various gleaner units 30.

Figure 4:
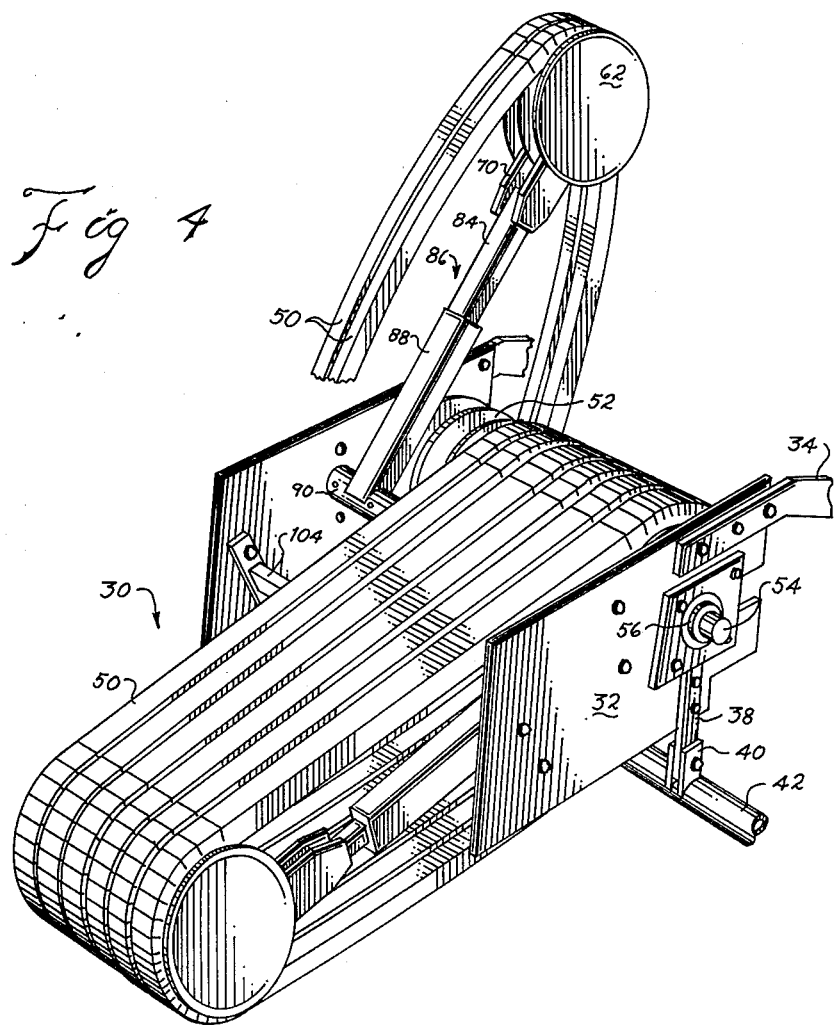
FIG. 4 is a perspective view of one gleaning unit with one arm raised for inspection or maintenance.

Each of the belts 50 is trained from one of the drive pulleys 52 to ground pulley 62. The ground pulleys are mounted by pairs, as may be particularly seen in FIGS. 4 and 5. Ground shaft 64 has two distal bearings 68 thereon. One bearing is attached to one bifurcation plate 70 and the other bearing 68 is attached to another bifurcation plate 70. Therefore, the ground shaft 64, being attached by the two distal bearings 68 to two separate bifurcation plates 70, is quite securely attached. By having the two bearings, it is not subject to twisting or misalignment as is the case by a pulley attached by a single bearing. It may be seen that each of the ground pulleys 62 are slotted in the middle to accommodate the bifurcation plate 70.

The construction of the ground pulleys is according to the illustration of FIG. 5 wherein it is plainly illustrated. However, it will be noted that two outer plates 72 are welded to nuts 74 which are threaded to the ground shaft 64. Outer half face 76 of the ground pulley 62 is attached, as by welding, to the outer plate 72. Center plate 78 divides the two pulleys and separates the two belts 50. Center half faces 80 are attached, as by welding, to the center plate 78.

The bifurcation plates 70 are attached by spacers 82 to inner member 84 of arm 86. The arm includes outer tubular member 88 which has sleeve 90 on the pivot end thereof. The sleeve 90 is telescoped over pivot shaft 92 which is attached to the side plate 32 by bolts. Both the outer member 88 and the inner member 84 are made of square tubing with the inner member 84 telescoped within the outer member 88. The inner member has plug 94 on the inner portion thereof. Axial bolt 96 is threaded within the plug 94. The axial bolt 96 has head 98 on the distal end thereof. It is to the distal end of member 84 that the bifurcation plate 70 are attached by the spacers 82. Nut 100 is welded within the end plate of the distal end of inner member 84 and provides a spacing device. Rotation of the axial bolt 96 by the head 98 changes the length of the inner member. Therefore, by changing the length of the inner member, the tension upon the belts 50 may be changed because of the action of helical compression spring 102 which is telescoped within the outer member 88 and biases the inner member 84 outward or distally therefrom.

Support bar 104 extends from one side plate 32 to the other. It is attached to the side plates by bolts. It will be understood that normally the ground wheel 62 will ride along the ground. Perhaps more accurately, the slotted belts 50 will ride on the ground and thus they will support the ground pulley 62. They are held against the ground by gravity. However, it will be understood that the limit of their downward travel is limited by support bar 104.

Thus it may be seen that I have provided a sturdy, durable cotton gleaner.

As an aid to correlating the terms of the claims to the exemplary drawing, the following catalog of elements is provided:

| 10 | wheeled vehicle | 58 | drive tube |
|---|---|---|---|
| 12 | wheels | 60 | hydraulic motor |
| 14 | cooling system | 62 | ground pulley |
| 16 | cab | 64 | ground shaft |
| 18 | ladder | 68 | bearings distal |
| 20 | basket | 70 | bifurcation plate |
| 22 | elevator | 72 | outer plate |
| 24 | header | 74 | nuts |
| 26 | auger | 76 | half face |
| 28 | elevator lower section | 78 | inner plate |
| 30 | gleaner units | 80 | half face |
| 32 | side plates | 82 | spacers |
| 34 | support arm | 84 | inner member |
| 36 | top tube | 86 | arm |
| 38 | feet | 88 | tubular member |
| 40 | ears | 90 | sleeve |
| 42 | lower tube | 92 | pivot shaft |
| 44 | extension member | 94 | plug |
| 46 | clamps | 96 | axial bolt |
| 50 | gleaner belt | 98 | head |
| 52 | drive pulley | 100 | nut |
| 54 | drive shaft | 102 | spring |
| 56 | bearings | 104 | support bar |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A cotton gleaner comprising the combination of:
  a. a wheeled vehicle,
  b. a header on the vehicle,
  c. a basket on the vehicle,
  d. an elevator on the vehicle for conveying gleaned cotton from the header to the basket,
  e. a cross conveyor in the header for moving the gleaned cotton to the elevator,
  f. a plurality of gleaner units,
  g. each gleaner unit having two side plates attached to the header,
  h. each unit having a drive shaft journalled in bearings on the side plates,
  j. a plurality of drive pulleys on each shaft, and
  k. a slotted gleaner belt trained around each pulley,
  m. a plurality of ground pulleys,
  n. a pivot shaft extending between the side plates,
  o. a plurality of arms having a distal end and a pivot end journalled to the pivot shaft, and
  p. the belt is also trained around one of the plurality of ground pulleys;
  q. a bifurcation on the distal end of each arm,
  r. two of said ground pulleys attached to a single ground shaft, and
  s. two distal bearings on each of the ground shafts,
  t. the two distal bearings of each ground shaft attached to the bifurcation of the arm.

2. The invention as defined in claim 1 further comprising:
  a hydraulic motor means drivingly connected to said drive shaft for urging the gleaner belts to rotate so that the belts maintain synchronized travel on the ground.

3. The invention as defined in claim 1 wherein each of said arms has
  u. an outer tubular member at the pivot end thereof,
  v. an inner telescoped into the outer tubular member at the distal end thereof, and
  w. a helical compression spring biasing the inner member out of the outer member;
wherein the improvement further comprises:
  x. an axial bolt extending along the axis of the inner member,
  y. said axial bolt being means for expanding the length of the inner member.

4. The invention as defined in claim 3 further comprising:
  z. a head on one end of the axial bolt which extends beyond the distal end of the inner member.

5. The invention as defined in claim 3 further comprising:
  z. a hydraulic motor means drivingly connected to said drive shaft for urging the gleaner belts to rotate so that the belts maintain synchronized travel on the ground.

6. In a cotton gleaner unit having:
  a. two side plates,
  b. a drive shaft journalled in bearings on the side plates,
  c. a plurality of drive pulleys on the drive shaft,
  d. a plurality of ground pulleys,
  e. a pivot shaft extending between the side plates,
  f. a plurality of arms having a distal end and a pivot end journalled to the pivot shaft, and
  g. a belt trained around
    (i) each drive pulley, and
    (ii) one of the plurality of ground pulleys;
wherein the improvement comprises:
  h. a bifurcation on the distal end of each arm,
  j. two of said ground pulleys attached to a single ground shaft, and
  k. two distal bearings on each of the ground shafts,
  m. the two distal bearings of each ground shaft attached to the bifurcation of the arm.

7. The invention as defined in claim 6 wherein each of said arms has
  n. an outer tubular member at the pivot end thereof,
  o. an inner member telescoped into the outer tubular member at the distal end thereof, and
  p. a helical compression spring biasing the inner member out of the outer member;
wherein the improvement further comprises:
  q. an axial bolt extending along the axis of the inner member,
  r. said axial bolt being means for expanding the length of the inner member.

8. The invention as defined in claim 7 further comprising:
  s. a head on one end of the axial bolt which extends beyond the distal end of the inner member.

* * * * *